United States Patent
Kawai et al.

(10) Patent No.: US 7,071,250 B2
(45) Date of Patent: *Jul. 4, 2006

(54) METHOD FOR PRODUCING ETHYLENE-VINYL ALCOHOL COPOLYMER RESIN COMPOSITION

(75) Inventors: Hiroshi Kawai, Kurashiki (JP); Masao Hikasa, Kurashiki (JP); Takaharu Kawahara, Okayama (JP); Toshio Tuboi, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 475 days.

This patent is subject to a terminal disclaimer.

(21) Appl. No.: 10/050,928

(22) Filed: Jan. 22, 2002

(65) Prior Publication Data

US 2002/0143098 A1 Oct. 3, 2002

(30) Foreign Application Priority Data

Jan. 22, 2001 (JP) .............................. 2001-012802
Jan. 22, 2001 (JP) .............................. 2001-012803

(51) Int. Cl.
*C08L 3/00* (2006.01)
*C08L 89/00* (2006.01)
*C08K 5/00* (2006.01)

(52) U.S. Cl. .................... 524/47; 524/500; 524/515
(58) Field of Classification Search ................ 524/47, 524/500, 515

See application file for complete search history.

(56) References Cited

U.S. PATENT DOCUMENTS

| | | |
|---|---|---|
| 4,320,041 A | 3/1982 | Abe et al. |
| 5,322,866 A | 6/1994 | Mayer et al. |
| 5,384,187 A | 1/1995 | Uemura et al. |
| 6,743,891 B1 * | 6/2004 | Kawai et al. ............. 528/494 |

FOREIGN PATENT DOCUMENTS

| | | |
|---|---|---|
| EP | 0 408 503 | 1/1991 |
| EP | 0 539 604 | 5/1993 |
| EP | 1 072 616 | 1/2001 |
| JP | 5-9334 | 1/1993 |
| JP | 5-39392 | 2/1993 |
| JP | 5-93092 | 4/1993 |
| JP | 10-158412 | 6/1998 |
| JP | 2000-43038 | 2/2000 |
| JP | 2000-191874 | 7/2000 |
| WO | WO 99/09095 | 2/1999 |

OTHER PUBLICATIONS

U.S. Appl. No. 09/621,271, filed Jul. 20, 2000, Kawahara et al.
U.S. Appl. No. 10/035,123, filed Jan. 4, 2002, Kawahara et al.
U.S. Appl. No. 10/050,962, filed Jan. 22, 2002, Kawai et al.
U.S. Appl. No. 10/728,939, filed Dec. 8, 2003, Kawahara et al.

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

A method for producing an ethylene-vinyl alcohol copolymer resin composition, said method comprising: (a) introducing into an extruder an ethylene-vinyl alcohol copolymer having a water content of at least 0.5 wt %; (b) further introducing into said extruder a liquid component comprising an aqueous solution of a resin, an aqueous dispersion of a resin, an aqueous dispersion of inorganic fine particles, or a mixture thereof; (c) subjecting said copolymer and said component to melt-kneading in said extruder; and (d) discharging the resulting ethylene-vinyl alcohol copolymer resin composition from the extruder. This method improves the dispersibility of a resin and/or inorganic fine particles in the EVOH while suppressing thermal deterioration of the EVOH.

14 Claims, 1 Drawing Sheet

METHOD FOR PRODUCING ETHYLENE-VINYL ALCOHOL COPOLYMER RESIN COMPOSITION

BACKGROUND OF THE INVENTION

1. Field of the Invention

The present invention relates to a method for producing an ethylene-vinyl alcohol copolymer (hereinafter abbreviated as "EVOH") resin composition.

2. Description of the Related Art

EVOH has a high gas barrier property and excellent oil resistance, aroma retention property, transparency, and the like. Due to these properties, EVOH is formed into films, sheets, bottles etc. and widely used for food packaging and the like.

Conventionally, various properties of EVOH, such as flexibility, impact resistance and moldability, have been improved by blending the EVOH with various resins. Addition of a starch-based polymer to EVOH is described in JP05 (1993)-9334A. In JP05 (1993)-9334A, EVOH pellets having a water content ranging from 20 wt % to 60 wt % and raw starch (corn starch with a water content of 12 wt %) are introduced into a Henschel mixer and mixed. The mixture is fed to a twin-screw extruder with a vent-port so as to be kneaded at a temperature of 120° C., melt-extruded in a strand form and pelletized. However, the starch-based polymer is not dispersed in the EVOH with sufficient homogeneity by this method. As a result, high quality molded products are not obtained due to starch coagulation in the molded products.

JP05 (1993)-93092 A describes a method for producing a resin composition comprising starch and EVOH. In JP05 (1993)-93092A, a mixture of starch and glycerol is fed to a twin-screw extruder and melted at 170° C. while EVOH is fed from a side feeding port of the twin-screw extruder, so that the mixture and the EVOH are melt-kneaded in the twin-screw extruder. In this method, the EVOH is previously melted by heating at 210° C. in a single-screw extruder. However, since the temperatures in the respective extruders are set as high as 170° C. and 210° C., the EVOH thermally deteriorates in the extruders, and this often causes coloring of the final resin composition. Moreover, since foaming due to decomposition gas occurs at high temperature, pellets with good visual properties are difficult to obtain.

It is also known that various properties of EVOH can be improved by adding inorganic materials. For example, JP05 (1993)-39392 A describes the addition of water-swelling phyllosilicate for improving the gas barrier property of EVOH. Specifically, JP05(1993)-39392A proposes a method of adding EVOH and methanol to an aqueous dispersion of the silicate (e.g., montmorillonite) so as to prepare an EVOH solution. The solution is cool-solidified, pulverized, and dried. However, volatilization of the methanol causes problems of working environment.

In another example described in JP2000-43038 A, an oxide such as silicon oxide is added to EVOH in order to improve lubricity for melt-molding the EVOH. JP2000-43038 A discloses a method for producing an EVOH resin composition, in which an EVOH solution is precipitated in a coagulation bath after adding fine particles of oxides. Similarly, volatilization of alcohol absorbed in the precipitation step causes problems of working environment.

JP10(1998)-158412 A also proposes the addition of clay minerals such as montmorillonite to a vinyl alcohol copolymer such as EVOH. Specifically, JP10(1998)-158412 A describes a method of melting and kneading in an extruder a vinyl alcohol copolymer including a dry mineral, and further adding water to the copolymer. Since the vinyl alcohol copolymer requires melt-kneading at a high temperature in this method (EVOH is heated to 220° C. in the Examples of the application), coloring due to thermal deterioration is a problem, especially when EVOH is used.

JP2000-191874A proposes a method of melt-kneading in an extruder a water-swelling layered inorganic compound like montmorillonite together with EVOH having a water content ranging from 25 wt % to 50 wt %. In this method, likewise, the inorganic compound is added as a powder. Since water-containing EVOH is used, the temperature for melt-kneading can be set lower in this method. However, it is not easy to obtain sufficient dispersion and cleavage of the inorganic compound simply by blending the powder in the extruder and kneading mechanically. The inorganic compound needs to be swollen with water contained in the EVOH while an excessively high water content will hinder molding of the EVOH, and thus, the water content of the EVOH should be controlled to within a relatively narrow range.

SUMMARY OF THE INVENTION

In the method for producing an EVOH resin composition of the present invention, EVOH having a water content of at least 0.5 wt % is introduced into an extruder. The component to be blended is added into the extruder with water, and kneaded with the water-containing and melted EVOH. Then, the component-blended EVOH (EVOH resin composition) is discharged from the extruder. The component added with water is selected from an aqueous solution of a resin, an aqueous dispersion of a resin, an aqueous dispersion of inorganic fine particles, and mixtures thereof.

According to the present invention, the EVOH can be melted at low temperature since the EVOH contains water. Therefore, thermal deterioration of the EVOH can be suppressed. By blending the resin and/or inorganic fine particles as an aqueous solution and/or aqueous dispersion into the water-containing, melted EVOH, the resin and/or inorganic fine particles can be dispersed more uniformly than by blending as a powder. Furthermore, the blended amount can be continuously controlled more easily than is the case when blending powders.

When a resin is blended with the EVOH, thermal deterioration and decomposition of the EVOH resin composition can also be suppressed. Especially when water-soluble resins such as polyvinyl alcohol (hereinafter abbreviated as 'PVA') that can be dissolved in water are added as aqueous solutions, the dispersibility and moldability are improved, and thus, molded products with better appearance can be obtained.

Since inorganic materials such as montmorillonite having water-swelling properties have faster cleavage when they are dispersed in water, the oxygen barrier property of the EVOH is improved by adding aqueous dispersions of such inorganic materials.

DETAILED DESCRIPTION OF THE INVENTION

Figure 1:
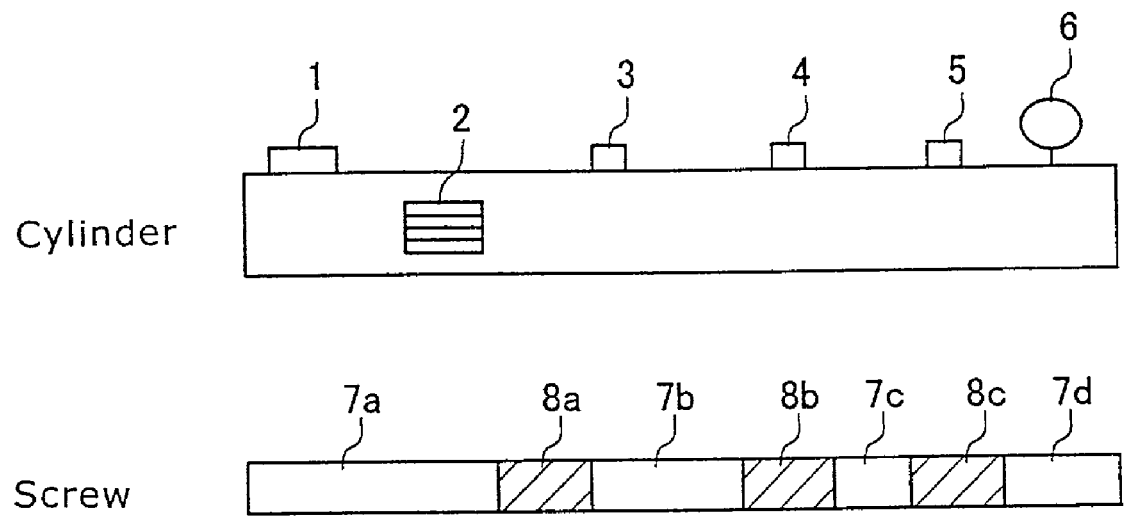
FIG. 1 is a side view showing a cylinder and a screw of a twin-screw extruder that can be used in one embodiment of the present invention.

Preferred embodiments of the invention will now be described with reference to accompanying FIG. 1.

The preferred concentration of the resin component (solid concentration) in either an aqueous solution or an aqueous dispersion of resin is in the range from 0.5 wt % to 70 wt %. An excessively low solid concentration may degrade blending efficiency while an excessively high concentration may lower the liquidity of the solution/dispersion so that sufficient dispersibility may not be obtained. From these viewpoints, the solid concentration is preferably in the range from 1.0 wt % to 65 wt %, more preferably, from 5.0 wt % to 60 wt %.

A suitable amount of the resin for blending with respect to 100 weight parts of EVOH ranges from 0.1 weight parts to 200 weight parts. When the amount of the resin is less than 0.1 weight parts, the desired effects of the blended resin may be insufficient. On the other hand, when the amount of the resin exceeds 200 weight parts, the gas barrier property may be insufficient. From these viewpoints, the amount of the resin for blending is preferably in the range from 1.0 weight parts to 150 weight parts, particularly, from 5.0 weight parts to 100 weight parts.

Resins which may be blended as an aqueous solution are not limited specifically as long as they are soluble in water. Such resins include PVA, EVOH, starch and starch derivatives, cellulose derivatives, polyacrylic acid and its salts, polyvinylpyrrolidone, polyoxyethylene glycol, polyoxypropylene glycol, and mixtures thereof. Properties such as solubility in water and biodegradability due to microorganisms can be achieved by blending the EVOH with water-soluble polymer compounds such as PVA and starch.

PVA is a saponified polymer of polyvinyl acetate, and preferably has a saponification degree of at least 80 mol %. The melting point and thermal decomposition temperatures of PVA are similar. When melt-kneaded with EVOH at or above its melting point (230° C.), the PVA tends to thermally decompose and foam. Simple blending of dry EVOH with PVA in an extruder often results in coagulation of the PVA, and this may cause defective appearance. In such a case, the interface between the coagulated PVA and EVOH will be brittle, and thus, powders may be generated during transportation or during a step of drying the pellets. On the other hand, when water-containing and melted EVOH and a PVA aqueous solution are melt-kneaded at low temperature of, for example, 170° C. or below, the dispersibility can be improved while suppressing gelation and thermal decomposition of the PVA, and thus, excellent molded products can be obtained.

Starch tends to decompose due to thermal deterioration at a temperature of around 200° C. Therefore, it will thermally decompose and foam at the temperature conventionally used for melt-molding of EVOH. However, when water-containing and melted EVOH and an aqueous solution of starch are melt-kneaded at a low temperature, e.g., at 170° C. or below, dispersion of the starch can be improved while suppressing thermal decomposition, and thus, good molded products can be obtained.

EVOH is water soluble when the ethylene content is at most 20 mol % and the saponification degree is at least 80 mol %. Such water-soluble EVOH will be susceptible to thermal deterioration if it is melt-kneaded at a temperature of 200° C. or higher. In addition, its dispersibility is reduced, and this causes deterioration in transparency of the molded products. However, when the water-soluble EVOH is melt-kneaded in accordance with the method of the invention, good molded products can be obtained while suppressing the thermal decomposition and gelation of the water-soluble EVOH.

Similarly, other water-soluble polymer compounds such as polyoxyethylene glycol and polyoxypropylene glycol can be used as plasticizers for EVOH.

Resins to be blended as aqueous dispersions are not specifically limited as long as they are dispersible in water. Aqueous dispersions can include suspensions and emulsions. Additives other than the resins, e.g., dispersion stabilizers, can be included as well. Emulsions are preferable from the viewpoint of dispersion stability. A stable dispersion can serve to prevent blocking at feeding portions of extruders, and it also facilitates quantitative blending. Resin emulsions can be selected from, for example, polyvinyl acetate-based emulsions, polyacrylic ester-based emulsions, polyurethane-based emulsions, EVOH emulsions, latex and mixtures thereof.

A polyvinyl acetate-based emulsion is may be selected from a vinyl acetate homopolymer and a copolymer that includes vinyl acetate as the main component and mixtures thereof. The copolymers can include, for example, acrylic ester, maleic acid, fumarate ester, aliphatic vinyl ester, or ethylene as a minor component. Preferred copolymers with ethylene contain ethylene in the range from 10 wt % to 30 wt %, and can be ternary copolymers containing styrene and acrylic acid and the like as a third monomer.

A polyacrylic ester-based emulsion may be selected from homopolymers of acrylic esters and/or methacrylic esters, and also copolymers that include the esters as a main component, and mixtures thereof. The copolymers can contain, for example, vinyl acetate, styrene, acrylonitrile, acrylamide, or acrylic acid.

A polyurethane-based emulsion may be an emulsion of a series of high molecular weight polyurethane resins having urethane bonds in the polymer.

An EVOH emulsion is an emulsion that includes EVOH as the main component.

Latex is an emulsion containing rubber particles dispersed in water. Examples are natural latex, IR (cis-1,4-polyisoprene) latex, SBR (styrene-butadiene rubber) latex, NBR (acrylonitrile-butadiene rubber) latex, CR (chloroprene rubber) latex, VP latex (SBR-based latex copolymerized with vinylpyridine monomer), MBR (methyl acrylate-butadiene copolymer) latex, and SB (styrene-butadiene copolymer) latex.

Plasticizers can be blended with either an aqueous solution or dispersion of resin. Plasticizers are relatively refractory compounds and have the function of improving processability or physical properties of polymeric materials to which they are added. Examples of plasticizers other than polyoxyethylene glycol and polyoxy propylene glycol are phosphate esters, phthalate esters, aliphatic monobasic acid esters, aliphatic dibasic acid esters, glycols, and glycerols.

As mentioned above, the resin may be blended as an aqueous solution or an aqueous dispersion. It is possible to blend a resin by adding more than one type of liquid sequentially or simultaneously, or by adding a liquid containing more than one type of resin. It is also possible to apply a liquid containing more than one type of resin in a dispersed or dissolved state depending on their water solubility.

The concentration of the inorganic fine particle component in an aqueous dispersion is typically in the range from 0.1 wt % to 50 wt %, more preferably from 0.5 wt % to 40 wt %, and particularly preferably from 1.0 wt % to 30 wt %.

When the concentration is excessively low, the effect of the inorganic particles may be insufficient. Moreover, since excessive water is included in the system, problems may occur, e.g., resin may leak from a dewatering slit or strands may become foamed, resulting in extrusion failure. When the concentration of inorganic particles is excessively high, the dispersibility is lowered due to re-coagulation of the fine particles, which may result in defective appearance and reduction in the oxygen barrier property.

Though the preferred blend amount of the inorganic fine particles depends on the nature of the particles, generally a suitable blend amount is from 0.001 weight parts to 50 weight parts per 100 weight parts of EVOH. When the blended amount is excessively low, blending effects are difficult to obtain, while an excessively high blended amount may hinder the melt-molding. From the viewpoints, the preferred blend amount for the inorganic fine particles is in the range from 0.005 weight parts to 30 weight parts, particularly preferably, from 0.01 weight parts to 10 weight parts.

The nature of the inorganic fine particles is not specifically limited as long as such particles are dispersible in water. The particles can be selected from glass-based fillers, such as glass fibers, glass flakes, and glass beads; zeolite; calcium carbonate; alumina; titanium oxide; silicon dioxide; potassium titanate; wollastnite; zinc oxide; barium sulphate; carbon fiber; inorganic layered compounds; and mixtures thereof.

Inorganic layered compounds are preferably used in order to improve the barrier property of the EVOH. Here, such an inorganic layered compound is configured by forming sheets of atoms bonded firmly by a covalent bond or the like and densely aligned. The sheets are laminated substantially in parallel by e.g., van der Waals forces or electrostatic forces. Examples include talc, micas, kaolinite, montmorillonite, and vermiculite. The inorganic layered compounds can be natural products or synthetic products.

Preferably, the inorganic layered compounds have a swelling property, that is, the compounds can be swollen or cleaved when immersed in water. Suitable examples include vermiculite, montmorillonite, and synthetic swelling fluorinated mica composed of layers into which lithium, sodium and the like may be intercalated. Particularly, montmorillonite and synthetic swelling fluorinated mica have excellent cleavage properties and operability. Here, swelling means that the separation of layers as measured by an X-ray diffraction method increases when the layers are immersed in a large excess of water. Cleavage means that the peaks corresponding to the spacing between the layers are decreased or lost due to a similar mechanism.

The preferred weight-average aspect ratio ($\alpha$) of the inorganic layered compound is at least 3, more preferably at least 5, and most preferably, at least 10. When the aspect ratio is less than 3, insufficient oxygen barrier effect may be provided. Here, weight-average aspect ratio ($\alpha$) of the inorganic layered compound denotes a value calculated by means of Formula 1 from the weight average flake diameter (l) and the weight average flake thickness (d).

$$a = l/d \qquad \text{[Formula 1]}$$

The weight average flake diameter (l) in Formula 1 is obtained by screening powder with a micro-sieve or a sieve having various aperture sizes, plotting the results in a Rosin-Rammlar diagram, and taking a value corresponding to an aperture $l_{50}$ of a micro-sieve or sieve which will pass 50 wt % of the whole powder subjected to the measurement. That is, the weight average flake diameter (l) of the powder is defined by Formula 2 or 3.

$$l = l_{50} \text{(for a micro-sieve)} \qquad \text{[Formula 2]}$$

$$l = 2^{0.5} \times l_{50} \text{(for a sieve)} \qquad \text{[Formula 3]}$$

Larger particles of the powder can be screened using a sieve, while fine particles can be classified using a micro-sieve.

The weight average flake thickness (d) of the inorganic filler denotes a value calculated from occupied area S of the flake on water surface, which is measured by Powder Film Method {C. E. Capes and R. C. Coleman, Ind. Eng. Chem. Fundam., Vol. 12, No. 2, P. 124–126 (1973)}.

$$d = W/\{\rho(1-\epsilon) \cdot S\} \qquad \text{[Formula 4]}$$

Here, W denotes the weight of the measured powder, $\rho$ denotes specific gravity of the powder, and $(1-\epsilon)$ denotes packing density when the powder is in the closest packed state on the water surface.

The method of the present invention is particularly suitable for blending inorganic layered compounds whose weight average aspect ratio ($\alpha$) is as high as that mentioned above. Since cleavage of inorganic materials having water-swelling properties (e.g. montmorillonite) is accelerated when the materials are dispersed in water, the oxygen barrier property of EVOH is improved by adding such an inorganic material in the form of an aqueous dispersion.

Preferably, the weight average flake diameter (l) of the inorganic layered compound is 10 μm or less, more preferably, 8 μm or less, particularly preferably, 6 μm or less. When the weight average flake diameter (l) exceeds 10 μm, dispersion stability of the aqueous dispersion is reduced, and the transparency of the resultant molded products may deteriorate.

In the case of using an inorganic layered compound, the blend amount is preferably in the range from 0.1 weight parts to 10 weight parts per 100 weight parts of EVOH. When the amount is less than 0.1 weight parts, insufficient improvement in the barrier property is obtained. When the amount exceeds 10 weight parts, the overall viscosity of the resin is increased hindering the molding. This may cause pin holes to be generated in the molded products.

When films or sheets of EVOH are rolled or laminated, the surfaces adhere to each other, resulting in wrinkles or the like. A blocking inhibitor like silicon oxide particles can be added to improve the slipping property of the molded product and thus to prevent such problems.

Suitable silicon oxide particles include synthetic silica particles, particularly, porous synthetic silica having a three-dimensional network structure of Si—O bonds provided by the gelation of silica. Preferred average particle diameters for the silica particles are no more than 10 μm, more preferably, no more than 5 μm, particularly preferably, no more than 3 μm. When the average particle diameter exceeds 10 μm, dispersion stability of the aqueous dispersion will deteriorate, as will the transparency of the molded product.

For the application of silica particles, the preferred blend amount is from 0.01 weight parts to 10 weight parts per 100 weight parts of an EVOH resin. When the amount is less than 0.01 weight part, insufficient improvement in the slipping property may be observed. With an amount over 10 weight parts, the silicon oxide particles may coagulate and reduce the transparency of the molded product.

As mentioned above, inorganic layered compounds and/or silicon oxide particles are preferred as inorganic fine particles. Alternatively, any of the other inorganic fine particles exemplified can be used alone or with either of the inorganic layered compounds described above pr with silicon oxide particles.

Melting and kneading of EVOH in the interior of an extruder is further described below by reference to FIG. 1. FIG. 1 shows a cylinder of a twin-screw extruder and a screw to be arranged inside thereof in one embodiment of the present invention. In this embodiment, water-containing EVOH is fed from a raw material feeding portion 1 of a twin-screw extruder. The water-containing EVOH is heated such that this is melted or semi-melted and then conveyed forward (to the right side in FIG. 1) by a full-flight screw 7*a*. Excess water is squeezed out at a dewatering portion 2. Then, the EVOH is mixed at an inverse flight screw 8*a* before it is fed to a full-flight screw 7*b*. Water vapor is discharged from a vent-port 3 so that the water content of the resin is further adjusted.

Subsequently, the EVOH is fed to an inverse flight screw 8*b* where the composition is melt-kneaded with an additive (for example, at least one component selected from a carboxylic acid, a boron compound, a phosphoric acid compound, an alkali metal salt, and an alkaline earth metal salt) fed from a minor component adding portion 4. Even after the dewatering step, the EVOH to be kneaded with the additive still contains water.

The water-containing and melted EVOH passes a full-flight screw 7*c* and is then conveyed to an inverse flight screw 8*c*, where it is melt-kneaded with resin and/or inorganic fine particles fed as an aqueous solution and/or aqueous dispersion from a resin/fine particle adding portion 5. The temperature of the EVOH is controlled based on values measured at a temperature sensor 6 positioned at the end of a final fill-flight screw 7*d*.

It is preferable to add to the extruder the aqueous liquid containing either a resin and/or inorganic fine particles as a solute or a dispersoid (hereinafter abbreviated as 'resin/fine particle added water' or 'water with a component') after a washing step. The washing step is carried out as required. When the 'water with a component' is added following the addition of other additives such as a carboxylic acid, control of the amount of the additive will be facilitated. When resin is present as the component, a complex can form with the above-identified additives, or when the component is the inorganic fine particles which may trap the additives, control of the amount of additives can be difficult when the 'water with a component' is added earlier.

The EVOH can be obtained by saponifying an ethylene-vinyl ester copolymer. A suitable content of ethylene is generally from 3 mol % to 70 mol %. From the viewpoint of providing molded products having high a gas barrier property and excellent melt moldability, the content of ethylene is preferably from 10 mol % to 60 mol %, more preferably from 20 mol % to 55 mol %, and most preferably from 25 mol % to 55 mol %. Furthermore, the saponification degree of the vinyl ester component is preferably from 80 mol % to 100 mol %. From the viewpoint of providing EVOH having a high gas barrier property, the saponification degree is preferably 95 mol % or more, and particularly preferably 99 mol % or more.

EVOH having an ethylene content ranging from 3 mol % to 20 mol % is suitable provided it is sufficiently water soluble. Such an aqueous solution of EVOH has an excellent gas barrier property, film formation property, and is excellent for use as coating material. EVOH having a saponification degree ranging from 80 mol % to 95 mol % is suitable for improving the melt moldability. It may be possible to use such EVOH alone. Such EVOH may also be used by blending it with EVOH having a saponification degree of 99 mol % or more.

Both EVOH containing ethylene in the range from 3 mol % to 20 mol % and EVOH having a saponification degree ranging from 80 mol % to 95 mol % are difficult to form into pellets of a stable shape when a methanol solution of the EVOH is simply extruded as strands in coagulation baths. However, by applying the present invention, the EVOH can be processed into pellets of a stable shape, and resins and/or inorganic fine particles to be blended with the EVOH can be added uniformly.

With an ethylene content of the EVOH less than 3 mol %, the resulting EVOH has poor melt moldability, and may have reduced water resistance, hot water resistance, and gas barrier properties under high humidity. On the other hand, with an ethylene content of more than 70 mol %, the resultant EVOH may not have a satisfactory gas barrier property, printability, or the like. Furthermore, when the saponification degree is less than 80 mol %, the resultant EVOH does not provide satisfactory gas barrier property, coloring resistance, and humidity resistance.

The EVOH to be introduced into the extruder should have a water content of at least 0.5 wt %. The preferred water content is at least 5 wt %, or more preferably, 7 wt %, since EVOH containing water in the above range can be melted at a temperature lower than the melting point of dry EVOH. In this manner, thermal deterioration of the EVOH in the extruder can be suppressed.

Preferably, the EVOH to be introduced into the extruder should have a water content of not more than 70 wt %. The preferred water content is not more than 60 wt %, or more preferably, not more than 50 wt %. When the water content is more than 70 wt %, phase separation between the resin and water contained in the resin is likely to occur in the EVOH resin composition. If such a phase separation occurs, the surface of the resin becomes wet, thus increasing the friction. As a result, bridges may form in the hopper of the extruder which may adversely affect the productivity of pellets of the EVOH resin composition.

There is no specific limitation on the method for adjusting the water content of the EVOH before introducing the EVOH into the extruder. To increase the water content, methods such as spraying water onto the resin, immersing the resin in water, bringing the resin into contact with water vapor, and the like, may be employed. Furthermore, to reduce the water content, appropriate drying methods may be employed. Methods of drying the resin include, for example, the use of a fluidized hot-air dryer or a ventilation hot-air dryer. From the viewpoint of reducing the unevenness of drying, a fluidized hot-air dryer is preferred. Furthermore, from the viewpoint of inhibiting thermal deterioration, the drying temperature is preferably 120° C. or less.

There is no specific limitation on the shape of the EVOH which may be used in the process of the invention. Preferably, the EVOH is formed as pellets by cutting strands precipitated in a coagulation bath. Crumb-shaped precipitation obtained by coagulating an EVOH paste to provide an indeterminate form can also be used. Alternatively, an EVOH paste can be introduced directly into the extruder.

It is possible to wash and remove the residue of the saponification catalyst contained in the EVOH inside the extruder. Specifically, a washing solution may be injected into at least one portion of the extruder so as to wash the EVOH, and the washing solution may be discharged from at least one portion downstream from the washing solution-injecting portion. This method is preferable because washing is performed effectively and a large washing space is not required as compared with the conventional method in which EVOH resin pellets are placed in a washing container and are brought into contact with a washing solution in a solid state to extract the residue of the saponification catalyst by diffusion from the interior of the pellets.

The saponification catalyst residue contained in the EVOH fed to the extruder is typically alkali metal ions. The above-mentioned washing in the interior of the extruder can be particularly effective when the content of the alkali metal ions is in the range from 0.1 wt % to 5 wt % in terms of metal. There is no great difference from a conventional washing process when the alkali metal ion content is less than 0.1 wt %. When the content exceeds 5 wt %, sufficient washing requires an extruder with a large screw length (L)/screw diameter (D), and this will raise the cost. The alkali metal ion content should preferably be at least 0.2 wt %, or more preferably, at least 0.5 wt %. The content is preferably not more than 4 wt %, more preferably, not more than 3 wt %.

The alkali metal ions contained in the washed EVOH is not more than 0.05 wt % in terms of metal, and preferably, not more than 0.04 wt %, or most preferably, not more than 0.03 wt %. When alkali metal ions remains at more than 0.05 wt %, the thermal stability of the EVOH may deteriorate.

There is no specific limitation on the washing solution as long as it can remove a residue of the saponification catalyst. For example, water can be used. An aqueous solution of an acid having a pKa of at least 3.5 at 25° C. is suitable. When a solution of an acid having a pKa of less than 3.5 is used, the resulting EVOH has insufficient coloring resistance and interlayer adhesion. Carboxylic acids, particularly acetic acid or propionic acid are preferred as the acid with a pKa of at least 3.5. Preferred carboxylic acid concentrations in an aqueous solution are in the range from 0.01 g/liter to 10 g/liter, especially, from 0.1 g/liter to 2 g/liter. The preferred amount of the washing solution for injection is from about 0.1 liters to about 100 liters per 1 kg of EVOH.

There is no specific Imitation on the method of injection of the washing solution, as long as injection into an extruder can be performed. For example, injection can be carried out using a plunger pump. There is no specific limitation on the method of discharge of the washing solution, as long as the solution can be discharged from the extruder downstream of the injection point. For example, a dewatering slit or a dewatering hole can be used. Alternatively, plural injection portions and plural discharge portions can be provided.

In the present invention, the water-containing EVOH can be dewatered or degassed either after washing the EVOH or without washing the EVOH. Specifically, water (Liquid water or gas (water vapor)) can be discharged from at least one portion of the extruder. Though there is no specific limitation on the method of water discharge, a dewatering slit, a dewatering hole or a vent-port located at the cylinder of the extruder can be used for this purpose.

Either a dewatering slit or a dewatering hole is preferred since a slit or a hole can discharge a liquid or a gas, and can thus remove moisture efficiently from a resin with a high water content. On the other hand, a typical vent-port (e.g., a vacuum vent for removing water vapor under reduced pressure, and an open vent for removing water vapor under atmospheric pressure) can discharge water vapor only. Moreover, the resin tends to adhere to the vent-port and such adhered resin deteriorates and enters the extruder. Furthermore, when the dewatering hole is used, molded resin may leak from the hole. For this reason, a watering slit is most preferred. Preferred examples of such a dewatering slit include a wedge wire dewatering slit and a screen mesh type dewatering slit.

The above-mentioned dewatering means may be used singly or a plurality of the same type of dewatering means may be used, or a combination of different types of dewatering means may be used. For example, it is possible to remove an amount of water from resin having a high water content with a dewatering slit and then further removing water by a vent-port located downstream from the dewatering slit.

Subsequent to the respective steps of washing, dewatering and/or degassing as required, the resin is blended in the extruder with an additive selected from carboxylic acid, a boron compound, a phosphoric acid compound, an alkali metal salt and an alkaline earth metal salt. The additives can be used singly, or more preferably in combination selected in order to improve the respective properties of the EVOH.

Thermal stability can be improved by adding a carboxylic acid to the EVOH. The carboxylic acid can be selected from, for example, oxalic acid, succinic acid, benzoic acid, citric acid, acetic acid, propionic acid, and lactic acid. When some factors such as cost are taken into consideration, acetic acid, propionic acid or lactic acid is preferred.

The preferred content of carboxylic acid with respect to the dry EVOH resin composition is in the range from 10 ppm to 5000 ppm. When the carboxylic acid content is less than 10 ppm, insufficient coloring resistance during melt-molding may be obtained. When the content exceeds 5000 ppm, insufficient interlayer adhesion may not be obtained. A preferred lower limit for the carboxylic acid content is 30 ppm, more preferably, 50 ppm. A preferred upper limit for the carboxylic acid content is 1000 ppm, more preferably, 500 ppm.

The thermal stability of EVOH can be improved by adding a phosphoric acid compound to the EVOH. The content of phosphoric acid compound with respect to the dry EVOH resin composition is preferably from 1 ppm to 1000 ppm in terms of phosphate radical. Coloring of the molded product and the generation of gels and hard spots can be suppressed by adding a suitable amount of a phosphoric acid compound. The above-mentioned effects due to addition of the phosphoric acid compound will be apparent especially for a long-run molding of EVOH resin composition pellets and recycling the molded products. Examples of the phosphoric acid compound are acids such as phosphoric acid and phosphorous acid and their salts, though they are not limitative. The phosphate can be present in any form of primary phosphate, secondary phosphate, and a tertiary phosphate. Though there is no specific limitation, the cationic species is preferably in the form of an alkali metal salt or an alkaline earth metal salt. It is especially preferable that the phosphoric acid compound to be added is selected from sodium dihydrogenphosphate, potassium dihydrogenphosphate, disodium hydrogenphosphate, and dipotassium hydrogenphosphate.

The lower limit of the content of phosphoric acid compound with respect to the dry EVOH resin composition is preferably 10 ppm, and more preferably 30 ppm in terms of phosphate radical. The upper limit is preferably 500 ppm, and most preferably 300 ppm. By adding a phosphoric acid compound in the above range, the obtained EVOH resin composition will be more resistant to coloring and gelation. When the content of phosphoric acid compound is less than 1 ppm, insufficient suppression of coloration may be obtained at the time of melt molding. In particular, their phenomenon is observed significantly when thermal treatment is performed several times. A product obtained by molding the resin composition pellets may have poor recycling properties. Furthermore, when the content of phosphoric acid compound is more than 1000 ppm, more gels and hard spots are likely to form.

The thermal stability and mechanical properties of EVOH can be improved by adding a boron compound. The reason for this is thought to be that a chelate is formed between the EVOH and the boron compound. The boron compound can be selected, for example, from boric acids, esters of boric acids, borates, and boron hydrides. Examples of the boric acids are orthoboric acid, metaboric acid, and tetraboric acid. Examples of the esters of boric acids are triethyl borate and trimethyl borate. Examples of the borates are borax and alkali metal salts and alkaline earth metal salts of the above-identified boric acids. Among these compounds, orthoboric acid (hereinafter referred to as 'boric acid') is preferred.

The content of the boron compound in the pellets of the dried EVOH resin composition is preferably in the range from 10 ppm to 2000 ppm, and more preferably from 50 ppm to 1000 ppm in terms of boron. When the content is less than 10 ppm, insufficient improvement in the thermal stability may be obtained. When the content is more than 2000 ppm, gelation easily occurs, which may lead to the formation of defects.

By adding an alkali metal salt, in the interlayer adhesion and compatibility of the EVOH can be improved. It is preferable that the content of alkali metal salt in the EVOH is from 5 ppm to 5000 ppm, more preferably from 20 ppm to 1000 ppm, still more preferably from 30 ppm to 750 ppm in terms of the alkali metal element. As the alkali metal, lithium, sodium, potassium or the like may be used. As the alkali metal salt, aliphatic carboxylic acid salts, aromatic carboxylic acid salts, phosphoric acid salts, metal complexes or the like may be used. For example, sodium acetate, potassium acetate, sodium phosphate, sodium propionate, potassium propionate, lithium phosphate, sodium stearate, potassium stearate, sodium salts of ethylenediaminetetraacetic acid and the like may be employed. Among these, sodium acetate, potassium acetate, sodium propionate, potassium propionate and sodium phosphate are preferred.

When an alkaline earth metal salt is added, the improvement in coloring resistance is slightly reduced, however, the extent of adhesion of the heat-degraded resin to a die of a molding machine at the time of melt-molding using the resin composition can be further reduced. The alkaline earth metal salt is not particularly limited, and for example, magnesium salts, calcium salts, barium salts, beryllium salts and the like may be used. Particularly, magnesium salts and calcium salts are suitable. The anionic species of the alkaline earth metal salt is also not limited particularly, but acetate anions, propionic anions and phosphate anions are particularly suitable.

It is preferable that the alkaline earth metal content in the EVOH is from 10 ppm to 1000 ppm, more preferably from 20 ppm to 500 ppm in terms of metal. When the content of alkaline earth metal is less than 10 ppm, the improvement in long-run property may be insufficient. When the content of alkaline earth metal exceeds 1000 ppm, coloring at the time of resin melting may be more intense.

The above-mentioned additives such as carboxylic acid can be kneaded uniformly if these additives are blended in an extruder. EVOH resin composition pellets having excellent extrusion stability, coloring resistance and long-run property can be obtained with fewer gels and hard spots and less adhesion to the die when using less motor torque and less torque change of the extruder during a melt-molding. These effects can be obtained by feeding the additives to the extruder at a point where the EVOH contains water and is in a melted state. The additives can be blended more uniformly by feeding the additives to the extruder at a kneading portion.

There is no specific limitation on the method of adding the above-identified additives such as carboxylic acid. Examples of such methods are adding the additive as a dry powder in the interior of the extruder adding the additive as a paste impregnated with a solvent, adding the additive in a state suspended in a liquid, and adding a solution of the additive dissolved in a solvent. Particularly preferred from the viewpoint of dispersing the additive homogeneously in the EVOH is a method comprising adding a solution of the additive in a solvent. Though there is no specific limitation on the nature of the solvent, water is preferably used because water has a good solubility with respect to at least one of the above-mentioned additives, and advantages in terms of cost, ease of handling, safety in operation etc. The additive can be provided from one portion of the extruder, or it can be provided from two or more portions. As in the case of the washing solution, there is no specific limitation on the method of injecting the solution. The same holds true for the resin-fine particle containing water (water with a component).

When an additive such as a carboxylic acid is added to the EVOH in the from of a solution, the lower limit of the added amount of the solution is preferably 1 weight part, more preferably 3 weight parts, and particularly 5 weight parts, with respect to 100 weight parts of dry EVOH. Furthermore, the upper limit of the added amount of the solution is preferably 50 weight parts, more preferably 30 weight parts, and particularly 20 weight parts, with respect to 100 weight parts of dry EVOH. When the added amount of the solution is less than 1 weight part, the improvement in dispersibility of the additive may be reduced, since the concentration of the solution must generally be increased. Furthermore, when the added amount is more than 50 weight parts, it may be difficult to control the water content of EVOH, and thus phase separation between the resin and the water contained in the extruder.

In a conventionally known method of immersing EVOH in a treatment solution, it is difficult to obtain high quality crumb-shaped EVOH precipitation products or the like. By blending in an extruder, the EVOH of that form can be provided homogeneously with additives such as a carboxylic acid, and thus, EVOH resin composition pellets with consistent quality can be obtained.

The resin temperature in the extruder should be below a temperature at which EVOH begins to decompose, which is preferably from 70° C. to 170° C. If the resin temperature is lower than 70° C., EVOH may not melt completely. The resin temperature is preferably at least 80° C., or more preferably, at least 90° C. When the resin temperature exceeds 170° C., the EVOH may be susceptible to thermal deterioration. Moreover, since the evaporation of water is accelerated when the resin temperature is above 170° C., blending the EVOH with a dispersion or aqueous solution with a suitable concentration may be difficult. From such viewpoints, the resin temperature is preferably not more than 150° C., or more preferably, not more than 130° C. Though there is no specific limitation on the adjustment of the resin temperature, it is preferred that the temperature of a cylinder in the extruder is set in a proper manner.

The resin temperature can be determined by using a measured value of a temperature sensor applied to the extruder cylinder. Preferably, the temperature sensor is applied in the vicinity of a discharge port at a tip of the extruder.

The water content of the EVOH resin composition immediately after being discharged from the extruder is typically from 5 wt % to 40 wt %, particularly preferably, 5 wt % to 35 wt %. When the water content of the EVOH resin composition immediately after being discharged from the extruder exceeds 40 wt %, phase separation between the resin and the water contained in the resin may occur easily. The phase separation may induce foaming of the strands immediately after being discharged from the extruder. When the water content of the discharged EVOH resin composition is less than 5 wt %, heat-deterioration of the EVOH due to heat in the extruder may be observed, and thus, the EVOH pellets may not have sufficient coloring resistance. The water content can be adjusted by feeding water to the extruder, removing water from the extruder, or by combining feeding and removal of water to/from the extruder. The amount of water to be fed or discharged can be adjusted by considering also any water fed as a washing solution, an aqueous dispersion, an aqueous solution and the like.

There is no specific limitation on a method of pelletizing EVOH resin composition discharged from the extruder. For example, the resin composition can be extruded as strands from a die into a coagulation bath before being cut into predetermined lengths. For facilitating handling of the pellets, such a die may have a bore diameter ranging from 2 mm$\phi$ to 5 mm$\phi$ (hereinafter, $\phi$ denotes a diameter), and the strands can be cut to be about 1 mm to about 5 mm in length.

Usually, the thus obtained pellets are farther subjected to drying. The water content in the EVOH resin composition pellets after drying is generally not more than 1 wt %, preferably not more than 0.5 wt %. The method for drying is not particularly limited, however, ventilation drying, fluidized drying and the like are suitable. A multi-step drying process combining several drying methods may also be employed. Among these, a drying method comprising fluidized drying, followed by ventilation drying is preferred.

When EVOH resin composition pellets are treated by simply immersing in a treatment solution, generally the water content of the treated EVOH reaches a range from about 40 wt % to about 70 wt %. In the present invention, the water content of the EVOH resin composition immediately after being discharged from the extruder can be adjusted easily by melting the EVOH in the extruder and adding any required additives to the same extruder. The water content of the EVOH resin composition is preferably in the range from 5 wt % to 40 wt %. Moreover, use of such pellets containing less water can reduce energy consumption during any drying step.

Pellets with a water content over 40 wt % may adhere to each other at a drying temperature of 100° C. or more. Blending additives in an extruder is advantageous to prevent this adhesion.

A blend of at least two types of EVOH differing in polymerization degree, ethylene content, saponification degree and the like may be melt molded. Furthermore, various plasticizers, stabilizers, surfactants, coloring materials, ultraviolet absorbers, antistatic agents, desiccants, crosslinking agents, metal salts, fillers, reinforcing materials such as various types of fibers, etc. may be added to the EVOH.

A thermoplastic resin other than EVOH may be mixed with the EVOH. Examples of the thermoplastic resin include polyolefins (polyethylene, polypropylene, poly-1-butene, poly-4-methyl-1-pentene, ethylene-propylene copolymers, copolymers of ethylene and an $\alpha$-olefin having at least 4 carbon atoms, copolymers of a polyolefin and maleic anhydride, ethylene-vinyl ester copolymers, ethylene-acrylic acid ester copolymers, modified polyolefins in which these polyolefins are grafted with an unsaturated carboxylic acid or its derivative, etc.), various types of nylons (nylon-6, nylon-6,6, nylon-6/nylon-6,6 copolymers, etc.), polyvinyl chloride, polyvinylidene chloride, polyester, polystyrene, polyacrylonitrile, polyurethane, polyacetal, modified polyvinyl alcohol resin, and the like.

The thus obtained EVOH resin composition pellets may be melt-molded into various forms such as films, sheets, containers, pipes, fibers and the like by melt molding. These molded products can be crushed and re-molded for reuse. The films, sheets, and fibers can be stretched unaxially or biaxially. Melt molding may be effected by extrusion molding, inflation, blow molding, melt spinning, injection molding and the like. The preferred temperature for melting is from about 150° C. to about 270° C., though it can be selected appropriately depending on melting point etc. of the copolymer.

The above-mentioned EVOH resin composition pellets can be molded as a film or sheet to be laminated with other layer(s) to provide a multilayered structure for use. Though there is no specific limitation on the multilayered structure, examples include E/Ad/T and T/Ad/E/Ad/T where E denotes an EVOH resin composition, Ad denotes an adhesive resin and T denotes a thermoplastic resin. Each of the layers can comprise a single layer or a multilayer.

The multilayered structure can be molded without any further treatment, or it can be stretched for improving its physical properties. A stretched multilayered structure can be a stretched film, a stretched sheet or the like having substantially no problems such as rupture, pin holes, uneven stretch and delamination. Uniaxial stretching or biaxial stretching methods may be employed. From the viewpoint of obtaining good physical properties, stretching in the highest possible stretching ratio is preferred. Examples of useful stretching methods include high draw ratio stretching methods such as deep-drawing formation, vacuum formation, etc., in addition to roll stretching methods, tenter stretching methods, tubular stretching methods, stretching blow methods, and the like. As the biaxial stretching, a simultaneous biaxial stretching method and a sequential stretching method may be employed. The stretching temperature is selected, for example, from 80° C. to 170° C., and preferably from 100° C. to 160° C. An EVOH resin composition comprising inorganic fine particles dispersed homogeneously prepared according to the present invention is improved in the oxygen barrier property by stretching since the dispersed inorganic fine particles become oriented. The oxygen barrier property is improved particularly in case of biaxial stretching.

Thus, the stretching is completed, followed by thermal fixation. The thermal fixation can be carried out by well-known means. For example, the thermal fixation is carried out at a temperature ranging from 80° C. to 170° C. and preferably from 100° C. to 160° C. for a time ranging from 2 seconds to 600 seconds with the stretched film under tension. Furthermore, the resultant stretched film may be subjected to a cooling treatment, a printing treatment, a dry laminating treatment, a solution coating or melt coating treatment, a bag-making process, a box process, a tube process, split process, and the like.

EXAMPLES

The present invention will be illustrated further in detail with reference to the following non-limiting examples. Ion exchange water was used in all cases.

(1) Measurement of Water Content

A sample of water-containing EVOH (20 g) was put in a well-dried weighing bottle, and dried at 120° C. for 24 hours in a hot air drying oven. From the change in the weight of the EVOH before and after drying, the water content of the EVOH was calculated using the following equation:

Water content(wt %)={(weight before drying−weight after drying)/weight before drying}×100

(2) Determination of the Added Minor Components

Determination was carried out according to the methods mentioned below.

The term 'dry chip' in the following description describes a product obtained by adding in an extruder at least one component selected from a carboxylic acid, a boron compound, a phosphoric acid compound, an alkali metal salt and an alkaline earth metal salt to an EVOH resin composition in an extruder drying the composition pellets at 100° C. for 15 hours by means of a fluidized hot-air dryer, and subsequently drying at 100° C. for 15 hours by means of a ventilation hot-air dryer.

(2-a) Determination of Acetic Acid Content

A sample of dry chips (20 g) was introduced into 100 ml of ion exchange water and heat-extracted for 6 hours at 95° C. The extract was subjected to acid-base titration with 1/50 N NaOH with phenolphthalein as indicator, so as to determine the acetic acid content.

(2-b) Determination of $K^+$ Ions

A sample of dry chips (10 g) was introduced into 50 ml of 0.01N aqueous hydrochloric acid and stirred at 95° C. for 6 hours. The stirred aqueous solution was subjected to quantitative analysis by ion chromatography. For a column, ICS-C25 manufactured by YOKOGAWA ELECTRIC CORP. was used. For eluant, an aqueous solution of 5.0 mM tartaric acid and 1.0 mM 2,6-pyridinedicarboxylic acid was used. In the determination, a calibration curve made with respect to an aqueous solution of potassium chloride was used. Thus, the amount of alkali metal salts in the dry chips was determined in terms of metal, based on the amount of $K^+$ ions.

(2-c) Determination of Boron Compound $Na_2CO_3$ aqueous solution was added to the sample chips and subjected to incineration in a platinum crucible at 600° C. Hydrochloric acid was added to dissolve the resulting sample. Then, the content of boron compound in the resulting sample was determined in terms of boron by an ICP emission spectral analysis.

(2-d) Determination of Phosphoric Acid Ion

A sample of dry chips (10 g) was introduced into 50 ml of 0.01N aqueous hydrochloric acid and stirred at 95° C. for 6 hours. The stirred aqueous solution was subjected to quantitative analysis by ion chromatography. For a column, ICS-A23 manufactured by YOKOGAWA ELECTRIC CORP. was used. For eluant, an aqueous solution containing 2.5 mM sodium carbonate and 1.0 mM sodium hydrogen carbonate was employed. In the determination, a calibration curve made with respect to an aqueous solution of phosphoric acid was used. Thus, the amount of phosphoric acid compound was determined in terms of phosphate radical based on the amount of the resultant phosphoric acid ions.

(3) Melt Index (MI)

Measurement was carried out according to ASTM-D1238, by using a melt indexer at a temperature of 190° C. and a load of 2160 g.

(4) Single-layered Film Formation Test (4-a) Film Appearance

A single-layered film of EVOH formed from dry pellets was formed using an extruder specified below, and the thus obtained film was evaluated in its appearance. In the evaluation, film appearance after 1 hour from starting the formation of the film was checked visually.

| (Specifications of the extruder) | |
|---|---|
| Extruder | GT-40-A manufactured by PLASTIC TECHNOLOGY CO., LTD. |
| Type | Single-screw extruder (non-vent type) |
| L/D | 26 |
| CR | 3.5 |
| Diameter | 40 mmφ |
| Screw | Single-start full-flight type, Nitriding steel surface |
| Rotation number | 40 rpm |
| Driving machine | DC electric motor SCR-DC218B manufactured by SUMITOMO HEAVY INDUSTRIES LTD. |
| Motor capacity | DC 7.5KW (rated 45A) |
| Heater | 4-parts split type |
| Die width | 300 mm |
| Temperature of resin in dies | 240° C. |
| Speed of extracting resin | 10 m/min |

(4-b) Coloring

A film as described in (4-a) was wound around a paper tube after 1 hour from the start of film formation for the purpose of a visual check of coloring of the film at the end face.

(5) Oxygen Transmittance

This was measured by means of the oxygen transmittance measuring assembly 'MOCONOX-TRANS 2/20 type' manufactured by MODERN CONTROLS INC., under a condition of 20° C., 65% RH according to the Japanese Industrial Standard (JIS) K7126 (isopiestic method).

(6) Haze

A specimen taken from the sample film was measured according to ASTM D1003-61 using 'HR-100' manufactured by Murakami Color Research Laboratory.

Example 1

A resin in water (PVA aqueous solution) with a concentration of 20 wt % was prepared by dissolving polyvinyl alcohol ('PVA-105' manufactured by Kuraray Co., Ltd.) in water.

EVOH pellets having an ethylene content of 44 mol %, saponification degree of 99.5 mol %, melt index of 5 g/10 min. in dry state, and water content of 50 wt % were introduced via a raw material feeding portion 1 of a twin-screw extruder configured as shown in FIG. 1. The amount of discharged liquid was 4.0 L/hour based on the collected solution that was discharged from dewatering portion (dewatering slit) 2 and vent-port 3. A treatment solution, that is an aqueous solution of acetic acid/boric acid/potassium dihydrogenphosphate, was added at minor component adding portion 4, and the PVA aqueous solution was added at resin/fine particles adding portion 5.

The amount of the EVOH pellets added was set to be 10 kg/hour (including the weight of water contained in the pellets) while the amount of the PVA aqueous solution added was set to be 1.25 L/hour and the amount of the aqueous solution of the minor components was set to be 0.25 L/hour. Concentrations of the respective minor components in the treatment solution were: 2.2 g/L for acetic acid, 30 g/L for boric acid, and 0.6 g/L for potassium dihydrogenphosphate.

The following are the specifications of the twin-screw extruder (the structure is identical to that shown in FIG. 1).

| Type | Twin-screw extruder |
|---|---|
| L/D | 45.5 |
| Bore diameter | 30 mmφ |
| Screw | Complete meshing In the support-adjusting member direction |
| Rotation number | 300 rpm |
| Motor capacity | DC22KW |
| Heater | 13-parts split type |
| Number of die holes | 5 holes (hole diameter: 3 mmφ) |
| Temperature of resin in dies | 100° C. |
| Speed of extracting resin | 5 m/min |

The resin temperature inside the extruder was 100° C., and water content of the EVOH resin composition pellets after being discharged from the extruder was 33 wt %. The pellets obtained under the above-described conditions were dried for 25 hours at 100° C. using a fluidized dryer, and subsequently dried for 15 hours at 100° C. using a ventilation dryer. Analysis of the dried EVOH resin composition pellets showed that the water content was 0.3 wt %, the content of acetic acid was 100 ppm, the content of boron compound was 270 ppm in terms of boron, the content of phosphoric acid compound was 20 ppm in terms of phosphate radical, and the content of alkali metal salt was 6 ppm in terms of potassium. The melt index was 1.5 g/10 min.

A single-layered film was formed from the obtained dry pellets, and the film product was evaluated in appearance and coloring. Coagulation was not observed on the film surface, and the appearance was good. Coloring due to thermal deterioration of the EVOH or PVA was not observed.

Example 2

A resin composition was obtained in the same manner as Example 1 except that the PVA aqueous solution to be added in the extruder was replaced by an EVOH emulsion.

The EVOH emulsion was prepared from EVOH as a dispersoid and water as a dispersion medium together with a dispersion stabilizer. The dispersion stabilizer was sulphonate anion modified EVOH containing EVOH and 1.2 mol % (with respect to the EVOH) of randomly copolymerized 2-acrylamide-2-methylpropane sulphonic acid sodium salt unit. The ethylene content was 33 mol %, the saponification degree was 99.6 mol %, and the melt index was 10 g/10 min. The EVOH dispersoid had an ethylene content of 32 mol %, a saponification degree of 99.5 mol %, and a melt index of 1 g/10 min. The resultant emulsion contained particles with an average particle diameter of 0.7 μm, and the solid concentration was 26 wt %.

In an analysis on the dried EVOH resin composition pellets, the water content was 0.3 wt %, the content of acetic acid was 100 ppm, the content of the boron compound was 270 ppm in terms of boron, the content of the phosphoric acid compound was 20 ppm in terms of phosphate radical, and the content of the alkali metal salt was 6 ppm in terms of potassium. The melt index was 1.5 g/10 min.

A single-layered film was formed from the obtained dry pellets, and the film product was evaluated in appearance and coloring. Coagulation was not observed on the film surface. Coloring due to thermal deterioration of the EVOH was not observed, and the appearance was excellent.

Comparative Example 1

A resin composition was obtained in the same manner as Example 1 except that EVOH pellets having an ethylene content of 44 mol %, saponification degree of 99.5 mol %, water content of 0.3 wt %, and melt index of 5 g/10 min. were introduced into the extruder via the raw material feeding portion, and that the resin temperature in the extruder was set to be 250° C.

The amount of EVOH pellets added was set to be 10 kg/hour (including the weight of water contained in the pellets). A PVA aqueous solution with a solid concentration of 20 wt %, prepared as in Example 1, was fed in from a resin/fine particles adding portion at a rate of 2.5 L/hour. A treatment solution containing 2.2 g/L acetic acid, 30 g/L boric acid, and 0.6 g/L potassium dihydrogenphosphate was added at a rate of 0.5 L/hour.

The resin temperature inside the extruder was 250° C. The resin composition discharged from the extruder was severely colored. Samples of the composition were not collected due to foaming caused by moisture.

Comparative Example 2

A 45 wt % methanol solution of ethylene-vinyl acetate copolymer with an ethylene content of 44 mol % was placed in a saponification reactor. A sodium hydroxide/methanol solution (80 g/L) was added thereto so as to be 0.4 equivalents with respect to the vinyl acetate component in the copolymer, and methanol was added thereto so that the concentration of the copolymer was adjusted to 20 wt %. The temperature was raised to 60° C. and reaction was performed for about 4 hours while blowing nitrogen gas into the reactor. After 4 hours, the reacted product was neutralized with acetic acid to stop the reaction. In this manner, a methanol solution of EVOH with an ethylene content of 44 mol % and a saponification degree of 99.5 mol % was obtained.

The EVOH solution was extruded from a metal plate having circular holes into water, thereby allowing the EVOH solution to precipitate in the form of strands. The strands were cut into pellets having a diameter of about 3 mm and a length of about 5 mm. A large amount of water was added to the dewatered pellets and the pellets were then dewatered in a centrifugal separator and the washing method repeated.

3.5 kg of the thus obtained EVOH pellets (water content: 55 wt %) were immersed in 6 L aqueous solution containing 0.1 g/L of acetic acid, 0.04 g/L of potassium dihydrogenphosphate, and 0.7 g/L of boric acid, at room temperature for 6 hours. After immersing, liquid was removed from the pellets, and the obtained pellets with water content of 55 wt % were dried at 80° C. for 15 hours with a fluidized dryer and then dried at 100° C. for 24 hours using a ventilation dryer. Thus, dry pellets (water content: 0.3 wt %) were obtained.

In the obtained dry pellets, the content of acetic acid was 100 ppm, the content of boron compound was 270 ppm in terms of boron, the content of phosphoric acid compound was 20 ppm in terms of phosphate radical, and the content of alkali metal salts was 10 ppm in terms of potassium. The melt index was 1.5 g/10 min.

To 100 weight parts of the pellets, 5 weight parts of PVA ('PVA-105' powder manufactured by Kuraray Co., Ltd.) applied in Example 1 were added before being mixed well for 5 minutes in a tumbler manufactured by NISSUI KAKO. Next, the thus obtained mixture was introduced into an extruder configured as shown in FIG. 1 via the raw material feeding portion at a rate of 10 kg/hour. An extrusion test was carried out in a similar manner as Example 1 except that the resin temperature in the extruder was set to be 250° C. and no materials were added at either the minor component adding portion or the resin/fine particles adding portion.

The resin temperature at the discharge port was 250° C. As a result of drying the obtained pellets at 100° C. for 25 hours by means of a fluidized dryer, the water content was reduced to 0.3 wt %. At this time, a large amount of fine powder was generated inside the fluidized dryer.

A single-layered film was formed from the obtained resin composition pellets, and the film product was evaluated in appearance and coloring. Coagulation was observed on the whole surface of the film, and the appearance was defective. Moreover, the film was considerably yellowed.

The results are shown in Tables 1–4.

TABLE 2

Components of treatment solutions

|  | Acetic acid (g/L) | Boric acid (g/L) | Phosphoric acid compound (g/L) |
|---|---|---|---|
| Example 1 | 2.2 | 30 | $KH_2PO_4$ 0.6 |
| Example 2 | 2.2 | 30 | $KH_2PO_4$ 0.6 |
| Com. Ex. 1 | 2.2 | 30 | $KH_2PO_4$ 0.6 |
| Com. Ex. 2 | 0.1 | 0.7 | $KH_2PO_4$ 0.04 |

TABLE 3

Components of resin compositions

|  | Acetic acid (ppm) | Boric acid (ppm) | Phosphoric acid compound (ppm) | Alkali metal salt (K: ppm) |
|---|---|---|---|---|
| Example 1 | 100 | 270 | 20 | 6 |
| Example 2 | 100 | 270 | 20 | 6 |
| Com. Ex. 1 | No samples were obtained due to foaming. | | | |
| Com. Ex. 2 | 100 | 270 | 20 | 10 |

*Boric acid concentration is indicated in terms of boron.
*Phosphoric acid compound concentration is indicated in terms of phosphate radical.
*Alkali metal (K) salt concentration is indicated in terms of metal.

TABLE 4

Evaluation results (film formation quality)

|  | Appearance | Coloring |
|---|---|---|
| Example 1 | Good | Good |
| Example 2 | Good | Good |
| Com. Ex. 1 | Foamed | |
| Com. Ex. 2 | Coagulation | Yellowed |

*Appearance and coloring were checked visually.
*'Good' in coloring means no coloring.

Example 3

An aqueous dispersion of inorganic fine particles was prepared by adding 8.0 wt % of swelling fluorinated mica ('SOMACIF'® ME-100 manufactured by Co-op Chemical Co., Ltd.) to water and stirring for about 15 minutes with a

TABLE 1

Extrusion condition

|  | Resins (blend form/concentration) | Blended resin | | Addition amount of minor composition aqueous solution (L/hr) | Resin temp. (° C.) | Water content (%) | |
|---|---|---|---|---|---|---|---|
|  |  | Addition amount of solution (L/hr) | Blend amount (wt %) |  |  | Before introduction | Immediately after discharging |
| Example 1 | PVA (aqueous solution/20) | 1.25 | 5 | 0.25 | 100 | 50 | 33 |
| Example 2 | EVOH (emulsion/26) | 1.25 | 6.5 | 0.25 | 100 | 50 | 33 |
| Com. Ex. 1 | PVA (aqueous solution/20) | 2.5 | 5 | 5 | 250 | 0.3 | Foamed |
| Com. Ex. 2 | PVA (powder/—) | — | 5 | — | 250 | 0.3 | 0.3 |

* Resin concentrations are indicated as solid concentrations: weight %.
* Each EVOH charge is 10 kg/hr in a state containing water.
* Com. Ex. = Comparative Example Henschel mixer. The swelling fluorinated mica had an average particle diameter ranging from 1 μm to 5 μm, an aspect ratio ranging from 20 to 30, and the surface area was 9 m$^2$/g.

EVOH pellets having an ethylene content of 44 mol %, saponification degree of 99.5 mol %, melt index of 5 g/10 min. in dry state and water content of 50 wt %, were introduced via a raw material feeding portion 1 of a twin-screw extruder configured as shown in FIG. 1. The amount of discharged liquid was 4.0 L/hour based on the collected solution discharged from dewatering portion (dewatering slit) 2 and vent-port 3. A treatment solution containing an aqueous solution of acetic acid/boric acid/potassium dihydrogenphosphate was added from minor component adding portion 4, and the aqueous dispersion of swelling fluorinated mica was added from resin/fine particles adding portion 5.

The amount of EVOH pellets added was set to be 10 kg/hour (including the weight of water contained in the pellets), while the amount of aqueous dispersion of the inorganic fine particles added was set to be 1.25 L/hour and the amount of aqueous solution of the minor components was set to be 0.25 L/hour. The concentrations in the treatment solution were: 2.2 g/L for acetic acid, 30 g/L for boric acid, and 0.6 g/L for potassium dihydrogenphosphate.

The twin-screw extruder had the same structure as that used in Example 1.

The resin temperature inside the extruder was 100° C., and water content of the EVOH resin composition pellets after being discharged from the extruder was 33 wt %. The pellets obtained under the above-described conditions were dried for 25 hours at 100° C. using a fluidized dryer, and subsequently dried for 15 hours at 100° C. using a ventilation dryer. The water content was then 0.3 wt %. Analysis of the dried EVOH resin composition pellets showed that the content of acetic acid was 100 ppm, the content of the boron compound was 270 ppm in terms of boron, the content of phosphoric acid compound was 20 ppm in terms of phosphate radical, and the content of alkali metal salt was 6 ppm in terms of potassium. The melt index was 1.5 g/10 min.

A single-layered film was formed from the obtained dry pellets, and the film product was evaluated in appearance and coloring. Coagulation of the inorganic fine particles was not observed on the film surface. Coloring due to thermal deterioration of the EVOH was not observed, i.e., the appearance was excellent. This film had oxygen transmittance of 0.6 (cc/m$^2$·day·atm), and the barrier property was improved by about 2.5 times when compared to EVOH containing no inorganic fine particles. Furthermore, the film had a haze of 1.7%, which is substantially as good as that of EVOH containing no inorganic fine particles.

Example 4

A resin composition was obtained in the same manner as Example 3 except that the aqueous dispersion of the inorganic fine particles to be added into the extruder was changed.

The aqueous dispersion of inorganic fine particles was prepared as follows. The inorganic layered compound used here was montmorillonite ('KUNIPIA® F' manufactured by Kunimine Industries) having an average particle diameter ranging from 100 nm to 2000 nm, an aspect ratio of 320 (average), and a surface area of 25 m$^2$/g. The inorganic fine particles (4 wt %) were added to water, and stirred for about 15 minutes using a Henschel mixer.

A single-layered film was formed from the obtained dry pellets and tested. Coagulation was not observed on the film surface, and no coloring due to thermal deterioration of the EVOH or PVA was observed. That is, the appearance was excellent. This film had oxygen transmittance of 0.9 (cc/m$^2$·day·atm), the barrier property being improved by about 1.7 times when compared to EVOH containing no inorganic fine particles. Furthermore, the film had a haze of 1.7%, which is substantially as good as that of EVOH containing no inorganic fine particles.

Example 5

A resin composition was obtained in the same manner as Example 3 except that the aqueous dispersion of the inorganic fine particles to be added into the extruder was changed.

The aqueous dispersion of inorganic fine particles was prepared as follows. A porous synthetic silica used here was 'SYLYSIA® 310' manufactured by Fuji Silysia, which has an average particle diameter of 1.4 μm (Coulter-counter method), and a surface area of 300 m$^2$/g, (BET method). The synthetic silica (4 wt %) was added to water, and stirred for about 15 minutes using a Henschel mixer.

A single-layered film was formed from the obtained dry pellets and tested. Coagulation was not observed on the film surface, and no coloring due to thermal deterioration of the EVOH was observed. That is, the appearance was excellent. Since this film had excellent anti-blocking properties, it formed a good roll with substantially no wrinkles. This film had oxygen transmittance of 1.5 (cc/m$^2$·day·atm) which is substantially equivalent to EVOH containing no inorganic fine particles. The haze of 3.0% was a substantially-acceptable level with regard to the appearance.

Comparative Example 3

A resin composition was obtained in the same manner as Example 3 except that EVOH pellets having an ethylene content of 44 mol %, saponification degree of 99.5 mol %, water content of 0.3 wt %, and melt index of 5 g/10 min. were introduced into the extruder via the raw material feeding portion, and that the resin temperature in the extruder was set to be 250° C.

The amount of EVOH pellets added was set to be 10 kg/hour (including the weight of water contained in the pellets). An aqueous dispersion of 8.0 wt % 'SOMACIF® ME-100' (Co-op Chemical Co., Ltd.) prepared as in Example 3 was fed in from the resin/fine particles adding portion at a rate of 2.5 L/hour. A treatment solution composed of 2.2 g/L acetic acid, 30 g/L boric acid, and 0.6 g/L potassium dihydrogenphosphate, was added at a rate of 0.5 L/hour.

The resin temperature inside the extruder was 250° C. The EVOH discharged from the extruder was severely colored. Samples of the composition were not collected due to foaming caused by moisture.

Comparative Example 4

A 45 wt % methanol solution of ethylene-vinyl acetate copolymer with an ethylene content of 44 mol % was placed in a saponification reactor. A sodium hydroxide/methanol solution (80 g/L) was added thereto so as to be 0.4 equivalents with respect to the vinyl acetate component in the copolymer, and methanol was added thereto so that the concentration of the copolymer was adjusted to 20 wt %. The temperature was raised to 60° C. and reaction was performed for about 4 hours while blowing nitrogen gas into the reactor. After 4 hours, the reacted product was neutralized with acetic acid to stop the reaction. In this manner, a methanol solution of EVOH with ethylene content of 44 mol % and a saponification degree of 99.5 mol % was obtained.

The EVOH solution was extruded from a metal plate having circular holes into water, thereby allowing the EVOH solution to precipitate in the form of strands. The strands were cut into pellets having a diameter of about 3 mm and a length of about 5 mm. A large amount of water was added to the dewatered pellets and the pellets were then dewatered in a centrifugal separator and the washing method repeated.

3.5 kg of the thus obtained pellets (water content: 55 wt %) were immersed in 6 L aqueous solution containing 0.1 g/L of acetic acid, 0.04 g/L of potassium dihydrogenphosphate, and 0.7 g/L of boric acid, at 25° C. for 6 hours. After immersing and dewatering, the obtained EVOH resin composition pellets with water content of 55 wt % were dried at 80° C. for 15 hours with a fluidized dryer and then dried at 100° C. for 24 hours using a ventilation dryer. Thus, dry pellets (water content: 0.3 wt %) were obtained.

In the obtained dry EVOH pellets, the content of acetic acid was 100 ppm, the content of boron compound was 270 ppm in terms of boron, the content of phosphoric acid compound was 20 ppm in terms of phosphate radical, and the content of alkali metal salts was 10 ppm in terms of potassium. The melt index was 1.5 g/10 min.

To 100 weight parts of the dried pellets, 2 weight parts of the swelling fluorinated mica ('SOMACIF'® ME-100 manufactured by Co-op Chemical Co., Ltd.) applied in Example 3 were added before being mixed well for 5 minutes in a tumbler manufactured by NISSUI KAKO.

The thus obtained mixture of the EVOH pellets and the swelling fluorinated mica was introduced into the same extruder as that of Example 3. An extrusion test was carried out in a manner similar to Example 3 except that the resin temperature in the extruder was set to be 250° C. and no materials were added at either the minor component adding portion or the resin/fine particles adding portion.

The resin temperature at the discharge port was 250° C. As a result of drying the obtained pellets at 100° C. for 25 hours by means of a fluidized dryer, the water content was reduced to 0.3 wt %. A single-layered film of EVOH was formed from the obtained dry pellets, and the film product was evaluated in appearance and coloring.

Coagulation of the inorganic fine particles was observed on the whole surface of the film. Moreover, the film was considerably yellowed due to thermal deterioration of the EVOH, which made the appearance defective. This film had an oxygen transmittance of 1.5 (cc/m$^2$·day·atm), which is substantially equivalent to EVOH containing no inorganic fine particles. Substantially no improvement in the barrier property was provided by the inorganic fine particles. The film had a haze of 25%.

Comparative Example 5

An extrusion test was carried out as in Comparative Example 4 except that the inorganic fine particles to be added to the extruder were changed from 'ME-100' to 'SYLYSIA®310'.

Coagulation of the inorganic fine particles was observed on the whole surface of the film, so that the obtained film had a considerably defective appearance. The film had a haze of 10%, i.e., the transparency was worse than that of EVOH containing no inorganic fine particles. Oxygen transmittance of the film was 1.5 (cc/m$^2$·day·atm).

Reference Material

A 45 wt % methanol solution of ethylene-vinyl acetate copolymer with ethylene content of 44 mol % was placed in a saponification reactor, a sodium hydroxide/methanol solution (80 g/L) was added thereto so as to be 0.4 equivalents with respect to the vinyl acetate component in the copolymer, and methanol was added thereto so that the concentration of the copolymer was adjusted to 20 wt %. The temperature was raised to 60° C. and reaction was performed for about 4 hours while blowing nitrogen gas into the reactor. After 4 hours, the reacted product was neutralized with acetic acid to stop the reaction. In this manner, a methanol solution of EVOH with an ethylene content of 44 mol % and saponification degree of 99.5 mol % was obtained.

The EVOH solution was extruded from a metal plate having circular holes into water, thereby allowing the EVOH solution to precipitate in the form of strands. The strands were cut into pellets having a diameter of about 3 mm and a length of about 5 mm. A large amount of water was added to the dewatered pellets and the pellets were then dewatered in a centrifugal separator and the washing method repeated.

3.5 kg of the thus obtained EVOH pellets (water content: 55 wt %) were immersed in 6 L aqueous solution containing 0.1 g/L of acetic acid, 0.04 g/L of potassium dihydrogenphosphate, and 0.7 g/L of boric acid, at 25° C. for 6 hours. After immersing and dewatering, the obtained EVOH resin composition pellets with water content of 55 wt % were dried at 80° C. for 15 hours using a fluidized dryer and then dried at 100° C. for 24 hours using a ventilation dryer. Thus, dry pellets (water content: 0.3 wt %) were obtained.

In the obtained dry EVOH pellets, the content of acetic acid was 100 ppm, the content of boron compound was 270 ppm in terms of boron, the content of phosphoric acid compound was 20 ppm in terms of phosphate radical, and the content of alkali metal salts was 10 ppm in terms of potassium. The melt index was 1.5 g/10 min.

A single-layered film was formed only from dry pellets, and evaluation on the film surface was carried out. A high quality film with good appearance and less coloring was obtained. This film had oxygen transmittance of 1.5 (cc/m$^2$·day·atm), and the haze was 1.7%.

Tables 5–8 show results of Examples 3–5, Comparative Examples 3–5 and the Reference Material.

TABLE 5

| | | Inorganic fine particles | | | | Water content (%) | |
|---|---|---|---|---|---|---|---|
| | Compounds (wt %) | Addition amount of dispersion (L/hr) | Blend amount (weight part) | Treatment solution amount (L/hr) | Resin temp. (° C.) | Before introduction | Immediately after extrusion |
| Example 3 | ME-100 (8.0) (swelling fluorinated mica | 1.25 | 2 | 0.25 | 100 | 50 | 33 |
| Example 4 | KUNIPIA ® F (4.0) (montmorillonite) | 1.25 | 1 | 0.25 | 100 | 50 | 33 |
| Example 5 | SYLYSIA ® 310 (4.0) (porous synthetic silica) | 1.25 | 1 | 0.25 | 100 | 50 | 33 |
| Com. Ex. 3 | ME-100 (8.0) (swelling fluorinated mica | 2.5 | 2 | 0.5 | 250 | 0.3 | Vigorously foamed |
| Com. Ex. 4 | ME-100 (dried) (swelling fluorinated mica | — | 1 | — | 250 | 0.3 | 0.3 |
| Com. Ex. 5 | SYLYSIA ® 310 (dried) (porous synthetic silica) | — | 1 | — | 250 | 0.3 | 0.3 |
| Reference | — | — | — | — | 250 | 0.3 | 0.3 |

* Numerical value attached to each inorganic fine particle compound denotes dispersion concentration (wt %).
* Blend amount of inorganic fine particle denotes blend amount with respect to 100 weight parts of EVOH.

TABLE 6

Components of treatment solutions

| | Acetic acid (g/L) | Boric acid (g/L) | Phosphoric acid compound (g/L) |
|---|---|---|---|
| Example 3 | 2.2 | 30 | $KH_2PO_4$ 0.6 |
| Example 4 | 2.2 | 30 | $KH_2PO_4$ 0.6 |
| Example 5 | 2.2 | 30 | $KH_2PO_4$ 0.6 |
| Com. Ex. 3 | 2.2 | 30 | $KH_2PO_4$ 0.6 |
| Com. Ex. 4 | 0.1 | 0.7 | $KH_2PO_4$ 0.04 |
| Com. Ex. 5 | 0.1 | 0.7 | $KH_2PO_4$ 0.04 |
| Reference | 0.1 | 0.7 | $KH_2PO_4$ 0.04 |

TABLE 7

Components of resin composition pellets

| | Acetic acid (ppm) | Boric acid (ppm) | Phosphoric acid compound (ppm) | K (ppm) |
|---|---|---|---|---|
| Example 3 | 100 | 270 | 20 | 6 |
| Example 4 | 100 | 270 | 20 | 6 |
| Example 5 | 100 | 270 | 20 | 6 |
| Com. Ex. 3 | No samples were obtained due to foaming. | | | |
| Com. Ex. 4 | 100 | 270 | 20 | 10 |
| Com. Ex. 5 | 100 | 270 | 20 | 10 |
| Reference | 100 | 270 | 20 | 10 |

*Boric acid concentration is indicated in terms of boron.
*Phosphoric acid compound concentration is indicated in terms of phosphate radical.
*Potassium (K) salt concentration is indicated in terms of metal.

TABLE 8

Evaluation results (film formation quality)

| | Appearance | Coloring | Oxygen transmittance (cc/m² · day · atm) | Haze (%) |
|---|---|---|---|---|
| Example 3 | Good | Good | 0.6 | 1.7 |
| Example 4 | Good | Good | 0.9 | 1.7 |
| Example 5 | Good | Good | 1.5 | 3 |
| Com. Ex. 3 | No samples were obtained due to foaming. | | | |
| Com. Ex. 4 | Coagulation | Yellowed | 1.5 | 25 |
| Com. Ex. 5 | Coagulation | Good | 1.5 | 10 |
| Reference | Good | Good | 1.5 | 1.7 |

*Appearance and coloring were checked visually.
*'Good' in coloring means no coloring.

As mentioned above, the present invention provides an EVOH resin composition in which added resins and/or inorganic materials are further homogenized while suppressing any thermal deterioration of the EVOH. Addition of various additives also further improves the properties of the EVOH resin composition.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. A method for producing an ethylene-vinyl alcohol copolymer resin composition, said method comprising:
   (a) introducing into an extruder an ethylene-vinyl alcohol copolymer having a water content in a range 0.5–70 wt %, based on the total weight of water and copolymer, and melting said ethylene-vinyl alcohol copolymer having a water content;

(b) further introducing into said extruder a liquid component comprising an aqueous solution of a resin, an aqueous dispersion of a resin, an aqueous dispersion of inorganic fine particles having an average diameter of not more than 10 µm, or a mixture thereof;

(c) subjecting said melted ethylene-vinyl alcohol copolymer and said component to melt-kneading in said extruder; and (d) discharging the resulting ethylene-vinyl alcohol copolymer resin composition from the extruder.

2. The method according to claim 1, wherein the liquid component is at least an aqueous solution of a resin which comprises a polyvinyl alcohol, an ethylene-vinyl alcohol copolymer, starch or a starch derivative, a cellulose derivative, a polyacrylic acid or a salt thereof, polyvinyl pyrrolidone, polyoxyethylene glycol, polyoxypropylene glycol, or a mixture thereof.

3. The method according to claim 1, wherein the liquid component is at least an aqueous dispersion of a resin which comprises a polyvinyl acetate-based emulsion, a polyacrylic ester-based emulsion, a polyurethane-based emulsion, an ethylene-vinyl alcohol copolymer emulsion, a latex, or a mixture thereof.

4. The method according to claim 1, wherein the liquid component includes a resin, and the aqueous solution of a resin or the aqueous dispersion of a resin has a concentration of the resin component ranging from 0.5 weight % to 70 weight %.

5. The method according to claim 1, wherein the liquid component includes a resin, and the amount of the resin added per 100 weight parts of the ethylene-vinyl alcohol copolymer is in the range from 0.1 weight parts to 200 weight parts.

6. The method according to claim 1, wherein the liquid component is at least an aqueous dispersion of inorganic fine particles which has a concentration of inorganic fine particles ranging from 0.1 weight % to 50 weight %.

7. The method according to claim 1, wherein the liquid component includes inorganic fine particles, and the amount of inorganic fine particles added per 100 weight parts of the ethylene-vinyl alcohol copolymer is in the range from 0.001 weight parts to 50 weight parts.

8. The method according to claim 1, wherein the liquid component includes inorganic fine particles, and the inorganic fine particles are selected from inorganic layered compound particles, silicon oxide particles, and mixtures thereof.

9. The method according to claim 1, wherein the ethylene-vinyl alcohol copolymer has an ethylene content ranging from 3 mol % to 70 mol % and a saponification degree ranging from 80 mol % to 100 mol %.

10. The method according to claim 1, wherein the liquid component includes a resin, and the resin composition immediately after discharge from the extruder has a water content ranging from 5 weight % to 40 weight %.

11. The method according to claim 1, wherein the water content of the ethylene-vinyl alcohol copolymer in a melted state is adjusted in the extruder by feeding water to the extruder and/or removing water from the extruder.

12. The method according to claim 1, wherein the temperature of the ethylene-vinyl alcohol copolymer in the melted state is in the range from 70° C. to 170° C.

13. The method according to claim 1, wherein the ethylene-vinyl alcohol copolymer resin is further kneaded in the extruder with at least one additive selected from a carboxylic acid, a boron compound, a phosphoric acid compound, an alkali metal salt and an alkaline earth metal salt.

14. A method for producing ethylene-vinyl alcohol copolymer resin composition pellets, wherein an ethylene-vinyl alcohol copolymer resin composition obtained according to a method as claimed in claim 1 is cut to form pellets and subsequently dried until the water content is reduced to 1 weight % or lower.

* * * * *